United States Patent [19]

Alas et al.

[11] Patent Number: 4,697,682
[45] Date of Patent: Oct. 6, 1987

[54] TORSIONAL DAMPER DEVICE

[75] Inventors: Jacques Alas, Eaubonne; Michel Graton, Paris, both of France

[73] Assignee: Valeo, Paris, France

[21] Appl. No.: 803,323

[22] Filed: Dec. 2, 1985

[30] Foreign Application Priority Data

Dec. 5, 1984 [FR] France .............................. 84 18509

[51] Int. Cl.⁴ .............................................. F16D 3/14
[52] U.S. Cl. ..................................... 192/106.2; 464/68
[58] Field of Search ............... 192/106.2, 106.1, 70.18, 192/70.17, 70.16; 464/68

[56] References Cited

U.S. PATENT DOCUMENTS

| 3,514,974 | 6/1970 | Adachi | 64/27 |
| 4,398,625 | 8/1983 | Beccaris | 192/106.2 |

FOREIGN PATENT DOCUMENTS

| 1570798 | 6/1969 | France . |
| 2318348 | 2/1977 | France . |
| 2398927 | 2/1979 | France . |
| 2459914 | 1/1981 | France . |
| 2494795 | 5/1982 | France . |
| 2538479 | 6/1984 | France . |

Primary Examiner—Richard J. Scanlan, Jr.
Attorney, Agent, or Firm—Charles E. Brown; Charles A. Brown

[57] ABSTRACT

A torsional damper device, for use in friction disks in automobile vehicle clutches, for example, comprises at least two coaxial parts rotatable relative to one another within defined limits and damper means adapted to oppose such relative rotation. The damper means comprise at least one friction ring, two annular members and an elastic prestressing member disposed axially between the annular members. The prestressing member is adapted to urge the friction ring axially against one of the coaxial parts. It and one of the annular members constitute a pair of members of which one has at least one primary transverse land which is circumferentially subdivided and of which the other has at least two secondary transverse lands which are axially offset and circumferentially subdivided and each of which is adapted to contact selectively the primary transverse land.

23 Claims, 16 Drawing Figures

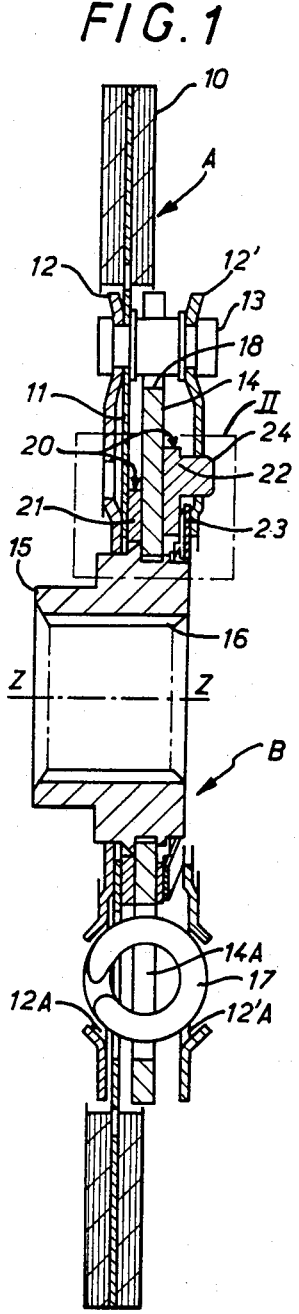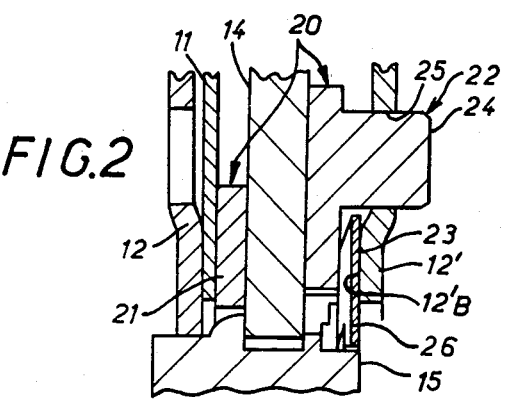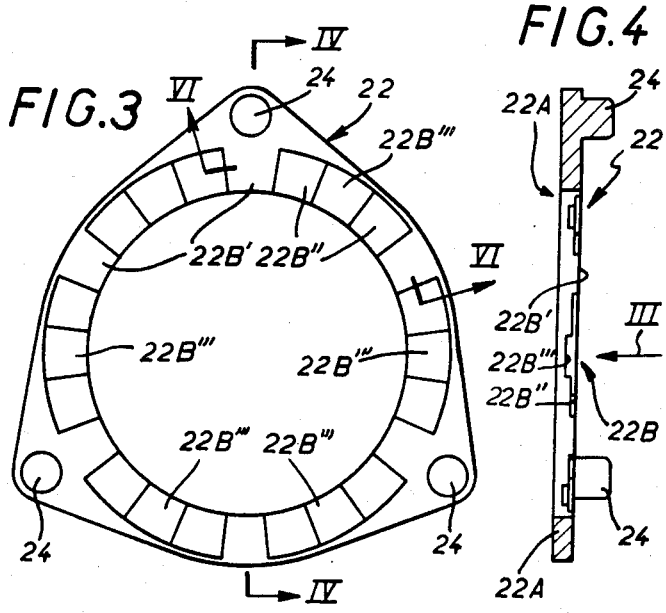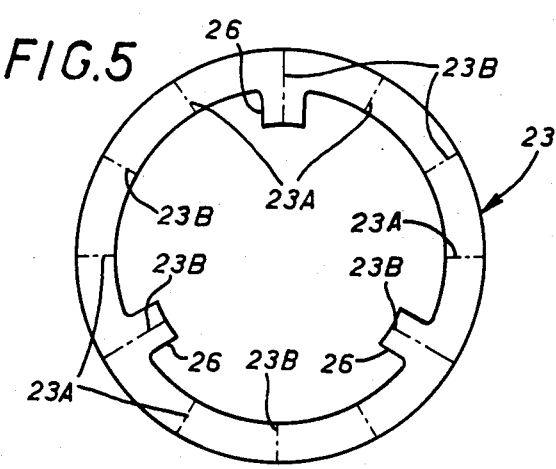

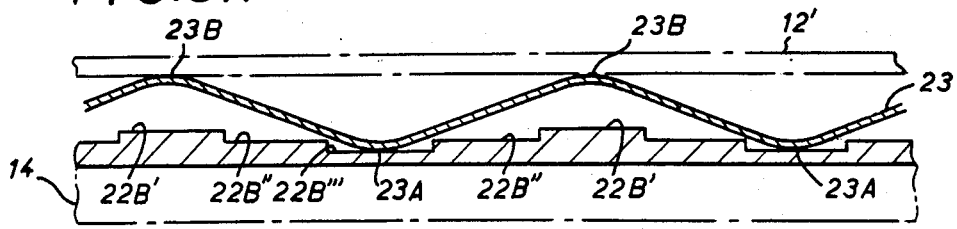
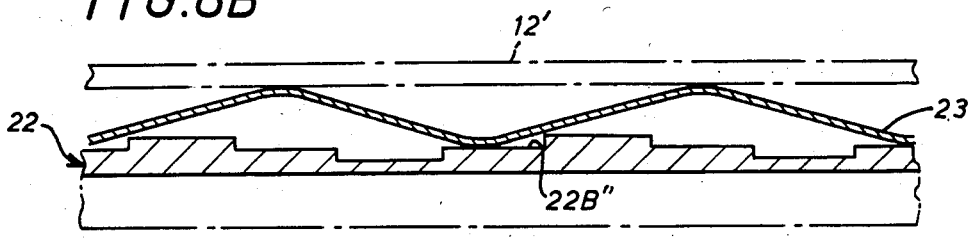
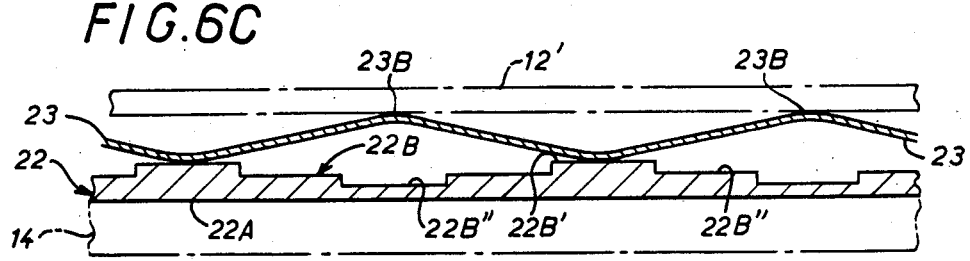
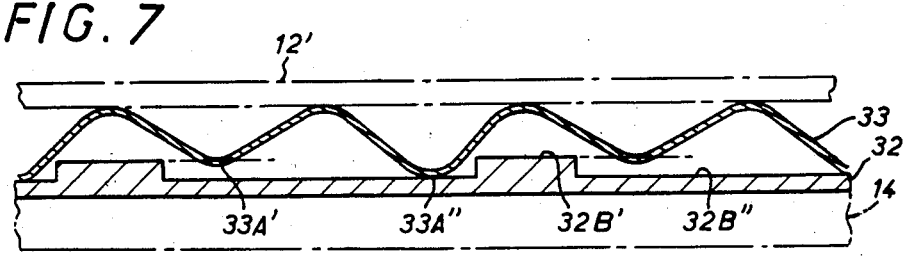
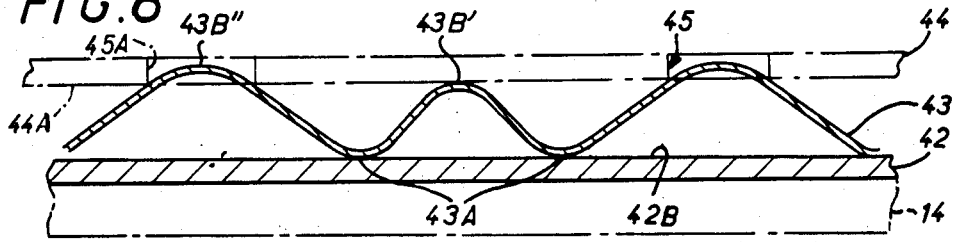

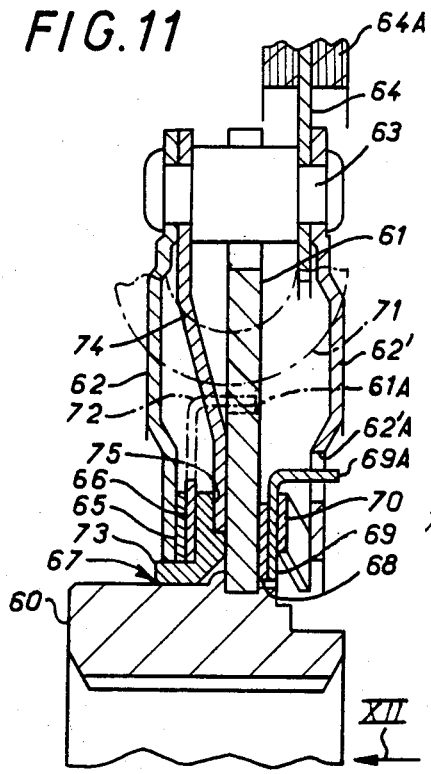
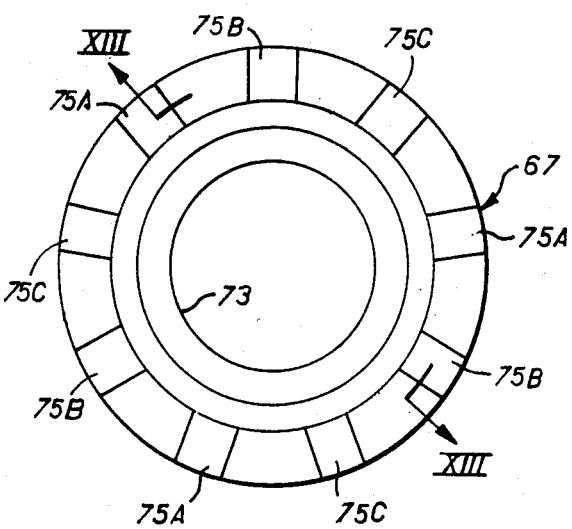
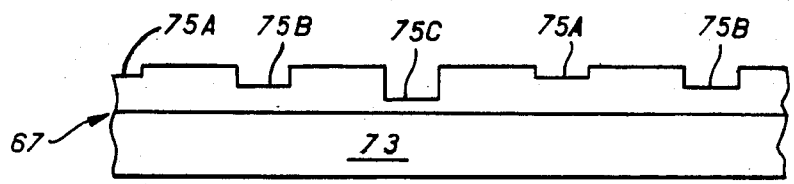
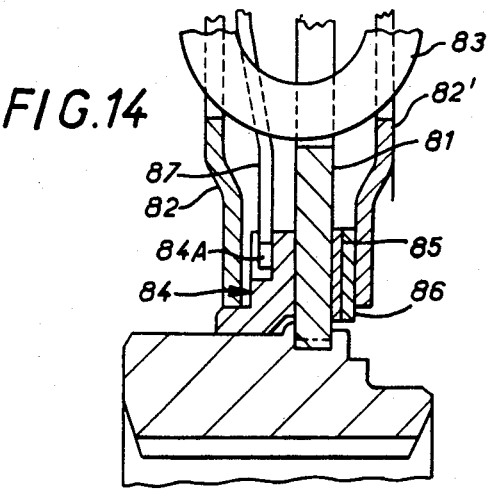

TORSIONAL DAMPER DEVICE

BACKGROUND OF THE INVENTION

1. Field of the Invention

The present invention concerns torsional damper devices of the kind comprising at least two coaxial parts disposed to rotate relative to one another within the limits of a defined sector of relative angular displacement and against the action of damper means.

2. Description of the Prior Art

As is known, in the case, for example, of a friction disk for a clutch, as for an automobile vehicle, for example, this rotation is further counteracted by circumferentially acting elastic means such as coil springs.

In practice the damper means principally consist in friction means comprising one or more spring loaded friction rings. A torsional damper of this kind is described, for example, in French patent application No. 2 494 795 published on May 28, 1982; in this instance one of the coaxial parts comprises two guide rings whereas the other comprises a flange disposed between these rings.

There are also known torsional damper devices in which a part of the friction means operates with variable hysteresis, which means that they are operative only beyond a minimum relative angular displacement. An example is given in U.S. Pat. No. 4,398,625 of Aug. 6, 1983.

It has been realized that although such torsional damper devices comprise parts suitable for diverse applications, such as the flange and the guide rings, for example, the same does not apply in the case of the friction means since these provide only for obtaining one value of spring loading of the friction rings which form part of them.

A principle objective of the invention is to provide for obtaining a number of levels of spring loading of the friction rings which form part of this kind of friction means.

SUMMARY OF THE INVENTION

The present invention consists in a torsional damper device comprising at least two coaxial parts disposed to rotate relative to one another within defined limits, and damper means adapted to oppose such relative rotation of said coaxial parts and comprising at least one friction ring, two annular members and an elastic prestressing member disposed axially between said annular members and adapted to urge said at least one friction ring axially against one of said coaxial parts, wherein said elastic prestressing member and one of said annular members constitute a pair of members of which one has at least one primary transverse land which is circumferentially subdivided and of which the other has at least two secondary transverse lands which are axially offset and circumferentially subdivided and each of which is adapted to contact selectively said at least one primary transverse land.

It will be understood that in accordance with the invention it is possible to vary the spring loading of the friction ring by varying the relative angular configuration of the aforementioned two members, providing for enhanced standardization of the torsional damper devices.

In accordance with advantageous features of the invention, the primary and secondary lands may be formed on the elastic prestressing member, which may in particular be a corrugated ring of the ONDUFLEX type or a frustoconical part comprising a portion forming a Belleville spring washer; it may also comprise flexible elastic radial fingers. When the primary or secondary lands are formed in a flank of the torsional damper device (a guide ring, for example), the invention provides for openings to be advantageously formed in this flank. In other cases the invention provides for the preferable implementation of steps or tiers, or notches of variable depth to constitute these primary or secondary lands. There are numerous ways in which to implement circumferentially subdivided lands on one and/or the other of the parts with which the elastic prestressing member cooperates.

Other objects, characteristics and advantages of the invention will emerge from the following description given by way of non-limiting example only with reference to the appended drawings.

BRIEF DESCRIPTION OF THE DRAWINGS

FIG. 1 is a view in axial cross-section of a friction disk incorporating a torsional damper device in accordance with a first embodiment of the invention.

FIG. 2 is a view to a larger scale of a detail indicated by a box II on FIG. 1.

FIG. 3 is a view in front elevation of a clamping ring of the torsional damper device of FIGS. 1 and 2 seen in the direction of the arrow III in FIG. 4.

FIG. 4 is a view of it in axial cross-section on the line IV—IV in FIG. 3.

FIG. 5 is a view in front elevation of an elastic washer of the torsional damper device of FIG. 1.

FIGS. 6A through 6C are partial views in circumferential cross-section on the curved line VI—VI in FIG. 3 of the torsional damper device of FIG. 1 for various relative angular configurations of the corrugated ring of FIG. 5 relative to the clamping ring of FIGS. 3 and 4 and of the associated guide ring.

FIG. 7 is a view analogous to FIGS. 6A through 6C but corresponding to an alternative embodiment of the torsional damper device of FIG. 1.

FIG. 8 is another view analogous to FIGS. 6A through 6C corresponding to a further embodiment of the torsional damper device of FIG. 1.

FIG. 11 is a half-view in axial cross-section of a friction disk integrating a torsional damper device in accordance with a third embodiment.

FIG. 12 is a view in front elevation as seen in the direction of the arrow XII in FIG. 11 of a spacer ring of the torsional damper device of FIG. 11.

FIG. 13 is a view of it in circumferential cross-section on the curved line XIII—XIII in FIG. 12.

FIG. 14 is a half-view in axial cross-section of a friction disk integrating a torsional damper device in accordance with a fourth embodiment of the invention.

DESCRIPTION OF THE PREFERRED EMBODIMENTS

Figure 9:
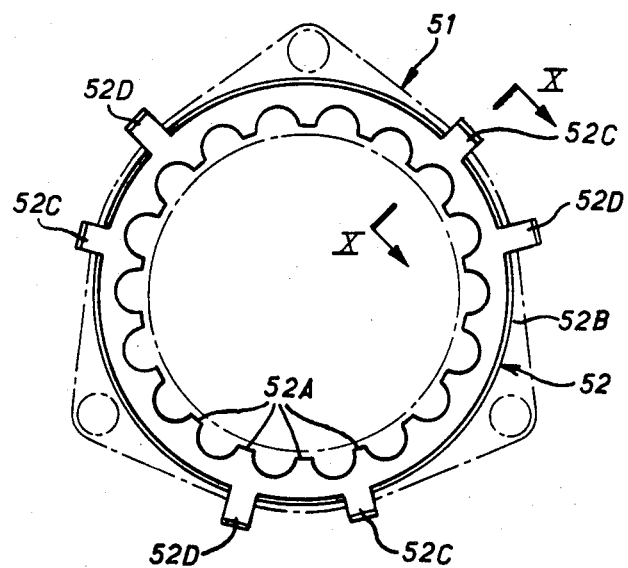
FIG. 9 is a view in axial front elevation of the clamping ring/Belleville washer assembly of a torsional damper device in accordance with a second embodiment of the invention.

FIGS. 1 through 14 show by way of example various embodiments of a torsional damper device in accordance with the invention in an application to clutch friction disks for automobile vehicles.

As is known, and as is seen particularly in FIG. 1, a clutch friction disk principally comprises at least two coaxial parts movable relative to one another by rotation about their common axis Z—Z within predetermined limits of relative angular displacement.

One of the coaxial parts, the part A, principally comprises friction facings 10 adapted to be intermittently compressed in the axial direction between two rotating plates of a clutch and which are mounted on an annular plate 11 called the facing-carrier disk and possibly subdivided into vanes, fastened to two guide rings 12 and 12' which are axially spaced and attached to one another by spacers 13, here in the form of pegs. The other coaxial part, the part B, principally comprises a transverse flange 14 disposed axially between the guide rings and a hub 15 rotationally coupled to said flange, possibly with angular play, against the action of elastic return members, adapted to be engaged, usually by axial splines, on a shaft (not shown) which is in practice the input shaft of a gearbox.

These coaxial parts A and B are rotatable relative to one another against damper means consisting of friction means and, according to one specific arrangement of the friction disks, against circumferentially acting elastic means, usually coil springs 17 bearing on the radial edges 12A, 12'A and 14A of openings formed in axial alignment in the hub and in the guide rings.

The flange 14 and the guide rings 12 and 12' generally have comparable overall radial dimensions, for the purpose of receiving these circumferentially acting elastic means; notches 18 are formed in the flange to provide for the passage of the pegs 13 and their generally radial edges usually limit the relative angular displacement between the parts A and B. Alternatively, this relative displacement may be limited by the turns of the springs 17 becoming contiguous.

The friction means intended to impede relative rotation of the coaxial parts A and B comprise at least one friction ring disposed axially between one of the guide rings and the flange and at least one elastic axial prestressing member adapted to apply spring loading to this friction ring. In practice the elastic axial prestressing member generally comprises a plurality of pressure lands circumferentially distributed and a clamping ring is sometimes disposed axially between this member and the friction ring in order to distribute within the friction ring the forces applied discontinuously by the elastic member. In other cases the nature and thickness of the friction ring are such that it of itself procures this distribution of forces, so constituting both a friction ring and a clamping ring.

In the embodiment of the invention shown in FIGS. 1 through 6C, the friction means 20 comprise a friction ring 21 disposed axially between the flange 14 and the annular plate 11, itself bearing axially against the guide ring 12, and, between the flange 14 and the guide ring 12', a friction and clamping ring 22 pressed against said flange 14 by a corrugated ring 23 forming an elastic axial prestressing member which bears on the other guide ring 12'. As proposed in the aforementioned published French patent application No. 2 494 795, the friction and clamping ring is, for example, of a plastics friction material such as a 6/6 polyamide with a 30% charge of glass fibers.

The ring 22 has projections 24, three in number in the example shown (FIG. 3), distributed circumferentially and engaged in holes 25 formed in the guide ring 12'. These projections 24 advantageously comprise, in their initial state, readily broken off pointed ends adapted, as proposed in the aforementioned published French patent application No. 2 494 795, to facilitate the engagement of the projections 24 in the holes 25. It will be noted that, because of these projections, the corrugated ring 23 is inserted between two parts 12' and 22 which are rotationally coupled but the axial distance between which is variable.

By virtue of its undulations, the corrugated ring 23 features in the circumferential direction a plurality of circumferentially and periodically distributed pressure lands 23A adapted to come into contact with the friction and clamping ring 22 and a plurality of circumferentially and periodically distributed bearing lands 23B, alternating with the pressure lands 23A, adapted to bear against the guide ring.

The term "friction face" will be used hereinafter to refer to the surface 22A of the ring 22 which is pressed against the flange 14, the term "application face" to refer to the surface 22B of this ring which is acted on by the corrugated ring 23, and the term "reaction face" to refer to the surface 12'B of the guide ring 12' on which this corrugated ring bears.

In accordance with the invention, the application face 22B of the friction and clamping ring 22 comprises at least two axially offset circumferential sets of receiving lands which are circumferentially distributed with the same period as the pressure lands 23A of the corrugated ring. In the example shown these sets of receiving lands are three in number and the lands 22B', 22B" and 22B''' are adjacent to one another; the lands 22B' are at a maximum distance from the friction face 22A whereas the lands 22B''' are at a minimum distance therefrom. The lands 22B' and 22B''' of which there are six, are disposed at intervals of 60° whereas the intermediate lands 22B", of which there are twelve, actually form two sets of lands disposed between the lands 22B' and 22B''' at intervals of 60°.

This arrangement on the application face 22B of a number of axially offset sets of receiving lands which are circumferentially offset makes it possible to obtain, with the same corrugated ring 23, several spring loading forces on of the friction and clamping ring 22; it is sufficient to modify the angular position of the corrugated ring 23 relative to the guide ring and to the friction and application ring. This ring 23 is advantageously provided for this purpose with radial lugs 26 providing access to it even after it is fitted between the rings 12' and 22 to provide for a supplementary adjustment after inspection favorable to a reduced reject rate.

FIGS. 6A through 6C represent three possible relative angular configurations of the corrugated ring 23 and the rings 12' and 22. The configuration of FIG. 6A corresponds to the maximum axial separation between the lands 23A and 23B of the corrugated ring, and therefore to minimum flattening of this ring and to a minimum friction force at the level of the face 22A of the ring 22. The configuration of FIG. 6C, which results from a 30° rotation of the corrugated ring relative to the ring 12', corresponds on the other hand to maximum flattening of the corrugated ring, and thus to a maximum friction force. The configuration 6B corresponds to an intermediate situation. Thus the friction produced is conditioned by the axial offset between the lands 22B', 22B", 22B'''.

FIG. 7 shows an alternative embodiment of the assembly comprising the corrugated ring and friction and clamping ring to the preceding figures, in which the corrugated ring 33 comprises two axially offset sets of pressure lands 33A' and 33A", alternating and circumferentially offset, and in which the friction and clamping ring 32 features steps 32B' projecting axially from the remainder of the application face 32B", circumferentially offset at the same angular interval as the pressure lands 33A' or 33A". In the FIG. 7 configuration, the pressure lands 33A' of the corrugated ring 33 are not in contact with the ring 32. This corrugated ring features a minimum number of points of contact with the friction and clamping ring and applies to it a low friction force. If, by rotation of the corrugated ring 33, the pressure lands 33A' are brought into contact with the steps 32B' (this configuration is not shown), the corrugated ring 33 would feature a maximum number of areas in contact with the friction and clamping ring 32 and would transmit to it a maximum friction force.

FIG. 8 shows a further embodiment in which the friction and clamping ring 42 has a plane application face 42B, the corrugated ring 43 has a single set of circumferentially distributed pressure lands 43A but two axially offset sets of alternating bearing lands 43B' or 43B", and the guide ring 44 comprises openings 45 circumferentially distributed at the same interval as the bearing lands 43B" which are axially farthest from the pressure lands 43A. In the configuration shown in FIG. 8 the lands 43B" are engaged in the openings 45 to the point where the corrugated ring butts up against the edges 45A of these openings.

In an alternative arrangement which is not shown, after rotation of this corrugated ring relative to the parts 42 and 44, the lands 43B" are disengaged from the openings 45 and bear, like the lands 43B' against the transverse surface 44A of the guide ring; this ring applies to the ring 42 a friction force which is greater than that exerted in the FIG. 8 configuration.

In another variation (not shown) on FIGS. 6A through 6C the corrugated ring features (when unstressed) a single set of bearing lands whereas the guide ring features, as in FIG. 8, openings offset circumferentially at an interval which is a multiple of the angular interval between the bearing lands on the corrugated ring. Depending on the angular position of the corrugated ring, according to whether the bearing lands are engaged or not in the openings in the guide ring, the friction and clamping ring is subject to a friction force which is either minimum or maximum.

It will be noted that in all the aforementioned variants, whether represented or not, there is one circumferentially subdivided (primary) transverse surface adapted to come into contact selectively, depending on its angular position, with one of several circumferentially divided and axially offset transverse (secondary) lands; one at least of the lands between which is disposed the corrugated ring is subdivided with an interval of subdivision which is preferably equal to the interval of the lands on the bearing ring which are facing this subdivided surface or a multiple or a submultiple of this interval: the ratio of this subdivision factor to that of the corresponding lands of the corrugated ring is preferably an integer. The subdivision of the aforementioned land may be irregular, so as, for example, to unload (or, on the contrary, to load) a number of lands of the corrugated ring which varies unit by unit, or virtually so. When it is the application face which is subdivided this also comprises at least two sets of axially offset receiving lands whereas, when it is the reaction face which is subdivided, it usually comprises openings.

Figure 10:
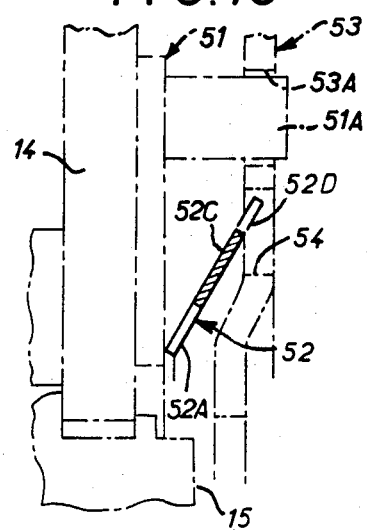
FIG. 10 is a view of it in partial axial cross-section on the line X—X in FIG. 9, after integration with said torsional damper device.

FIGS. 9 and 10 show a second embodiment of a torsional damper device in accordance with the invention in which the elastic axial prestressing member 52 comprises a Belleville washer, the friction and clamping ring 51 analogous to the ring 22 of FIGS. 3 and 4 is of constant thickness and the guide 53 features a plurality of circumferentially offset openings 54.

The elastic axial prestressing member 52 comprises a peripheral part 52B forming a Belleville washer, a plurality of radial projections 52A adapted to bear at their ends on the friction and clamping ring 51 and at least one set of outwardly radially projecting lugs (preferably at least two sets). As shown here, the member 52 comprises two sets 52C and 52D of such radial lugs, with different lengths.

These two sets of radial lugs are disposed so as to define groups of radial lugs 52C and 52D of different lengths and the guide ring 53 comprises the same number of openings 54 as there are radial lugs 52D, disposed in the same angular configuration.

In the configuration shown in FIG. 10 the longer lugs 52D are engaged in the openings 54 and the shorter lugs 52C bear against the ring 53; this results in minimum friction force. In another configuration (not shown), none of the radial lugs is engaged in the openings 54 and the elastic member 52 bears against the guide ring through the longer lugs 52D only; this results in maximum friction force. In a variation on this (not shown), the elastic member bears through its outside peripheral edge against the ring 53, the radial lugs being all engaged in openings in the guide ring.

It will be noted that, as previously, one of the transverse surfaces against which the elastic member 52 bears is circumferentially subdivided (primary face). This provides for varying the friction force by virtue of the presence on this elastic member of circumferentially offset radial lugs by virtue of which this elastic member comprises axially offset sets of action lands (secondary faces) adapted to operate selectively on the subdivided surface.

FIGS. 11 through 14 show a third embodiment of the invention in connection with a torsional damper provided with variable friction hysteresis; part of the friction means of this damper operates continuously whereas another part of these friction means operates only temporarily, when the angle between the two coaxial parts varies by more than a limiting value.

By analogy with one of the embodiments described in the aforementioned published French patent application No. 2 459 914, the friction disk of FIGS. 11 through 13 comprises a hub 60 to which is coupled a hub flange 61 and two guide rings 62 and 62', disposed one on each side of this flange and fastened together by pegs 63, and carrying a plate 64 to which are fixed facings 64A.

This friction disk comprises, disposed axially between the guide ring 62 and the flange 61, a first friction ring 65, a support flange 66 and a spacer ring 67, and, disposed between the flange 61 and the guide ring 62', a second friction ring 68, a clamping ring 69 and an elastic clamping member 70 shown as a corrugated ring.

The second friction ring 68 is in practice rotationally coupled, as by bonding, for example, to the clamping ring 69 which, like the ring 22 in FIGS. 1 and 2, is rotationally coupled to the guide ring 62' by lugs 69A engaged in holes 62'A in said ring 62'. This friction ring 68 tends to impede any angular movement of the hub flange relative to the guide rings, with an axial braking force which is set by the elastic member 70 which axially prestresses it.

As will emerge hereinafter, the first friction ring 65 tends on the other hand to impede relative angular movement between the flange 61 and the guide ring 62 immediately this exceeds a predetermined amplitude. This ring 65 is preferably fastened to the support flange 66, as by bonding, for example. This flange 66 is in turn rotationally coupled with predetermined angular play to the hub flange. By analogy with the aforementioned published French patent application No. 2 459 914, this coupling is obtained, for example, by means of two diametrically opposed yokes (not shown) which extend the flange 66 and surround without play two circumferentially acting springs 71 in substantially diametrically opposed positions, one of which is shown in chain-dotted line in FIG. 11; between the branches of the same yoke there is disposed a bent lug 72 (shown in chain-dotted line in FIG. 11) fastened to the flange 66 and which penetrates with circumferential play into the opening 61A in the flange through which the associated spring 71 is disposed. In practice the springs 71 are mounted with circumferential play in openings in the hub flange and without play in the guide rings.

In the example shown the spacer ring 67 features at its inside periphery a collar 73 which forms a bearing for the friction ring 65 and the support flange 66 as well as for the guide ring 62. This spacer ring 67 is in practice rotationally coupled to the assembly consisting of the guide rings and the plate to which the friction facings are fixed; it is also subjected to axial prestressing directed towards the guide ring 62 so as to press against the latter the friction ring 65. This axial prestressing and this rotational coupling are procured by a common elastic member which, in the example shown, comprises radial elastic lugs 74 (in the example in question there are three of these offset angularly at 120°) coupled at their radially outermost ends to the guide ring 62; as a variation, these lugs may form part of the plate supporting the friction facings when this plate is disposed between the flange 61 and this guide ring 62; these radial lugs 74 cooperate at their free ends, which are axially offset towards the flange 61 relative to their previously mentioned radially outermost ends, with radial notches formed in the spacer ring 67.

In accordance with the invention a plurality of notches 75 of different depths are formed in the spacer ring 67. As shown in FIGS. 12 and 13, this ring comprises three sets of three notches offset circumferentially, a different notch depth corresponding to each play 75A, 75B or 75C, the notches 75A being the least deep and the notches 75C the most deep.

It will be understood that the same lugs 74 will procure minimum clamping of the friction ring 65 against the guide ring 62 when these lugs are engaged in the notches 75C whereas the clamping effect will be maximum when the lugs are engaged in the least deep notches 75A.

On relative rotation of the guide rings and the flange 61, the friction ring 68 is operative frictionally as soon as such rotation begins, whereas the friction ring 65 remains inoperative until the circumferential play with which the support flange 66 is rotationally coupled to the flange 61 is taken up. In the aforementioned case where this support flange comprises two yokes surrounding without play two springs and two bent lugs engaged with play in the associated openings 61A, the aforementioned circumferential play corresponds to the assembly play of these lugs; given that the yokes of the support flange are engaged without play over the springs, taking up said circumferential play necessitates compression of the springs. After this play is taken up the friction ring 65 is constrained to rotate with the flange 61 and tends to oppose by friction any complementary relative rotation between the guide rings and the hub flange, its effects being added to those of the ring 68.

FIG. 14 shows another embodiment of the invention which is comparable with the embodiment shown in FIGS. 1 through 6C after replacement in the latter of the corrugated ring 23 with an elastic member analogous to that which has just been described in connection with FIGS. 11 through 13.

This FIG. 14 shows a friction disk comprising a hub flange 81 inserted axially between two guide rings 82 and 82' which are fixed to one another by spacers (not shown) and which conjointly collaborate with springs 83. On one side of the flange 81 there is disposed a friction and clamping ring 84 and on the other side of the flange 81 there are disposed a friction ring 85 and a spacer ring 86. The friction and clamping ring 84 is pressed against the flange 81 by an elastic prestressing member fastened to the guide ring 82 and provided with radial lugs 87 directed towards the axis of the friction disk.

It should be noted that the lugs 74 of the device of FIG. 11 and the lugs 87 of the friction disk exert on the rings 67 and 84 prestressing forces which are in opposite directions.

The friction ring 85 is constrained to rotate with the guide ring assembly, being bonded to the spacer ring 86, for example, which is, for example, coupled to the guide ring 82' by lugs similar to the lugs 69A in FIG. 11.

The friction and clamping ring 84 is likewise coupled to the guide ring assembly, through the intermediary of radial notches 84A which are formed in it to accommodate the lugs 87. As in FIG. 13, these notches are distributed in a number of sets of notches of different depths, by virtue of which, according to the depth of the notches in which the lugs 87 are actually accommodated, they exert a greater or lesser spring loading force to apply the rings 84 and 86 against the hub flange 81.

It will be noted that the notches conjointly constitute a plurality of axially offset subdivided secondary lands adapted to cooperate selectively with the subdivided primary land defined by the inside ends of the elastic fingers 74 or 87.

It goes without saying that the preceding description has been given by way of non-limiting example only and that numerous variants thereon may put forward, in particular by combining the various embodiments described, without departing from the scope of the invention. For example, in the case of the device of FIGS. 11 through 13, the invention may be applied to the friction means which are operative continuously and those which are operative only beyond a minimum angular displacement.

We claim:

1. A torsional damper device comprising at least two coaxial parts disposed to rotate relative to each other within defined limits and damper means for opposing such relative rotation of said coaxial parts, each of said coaxial parts including a coaxial member, a friction assembly for producing frictional torque in the course of relative rotation of said coaxial parts, said friction assembly comprising a plurality of annular members including said coaxial members of said coaxial parts, an elastic prestressing member and a friction ring member, said elastic prestressing member and said friction ring member being disposed axially between said coaxial members, said friction ring member being coupled for rotation with one of said coaxial members over at least part of said defined limits of relative rotation, said elastic prestressing member applying an axial bias to said friction ring member, said elastic prestressing member and another adjacent one of said annular members of said friction assembly having cooperable means for selectively preloading said friction assembly, a plurality of circumferentially spaced primary lands on one of said elastic prestressing member and said another adjacent annular member of said friction assembly, and two relatively axially offset pluralities of circumferentially spaced secondary lands on the other of said elastic prestressing member and said another adjacent annular member of said friction assembly, said plurality of primary lands being cooperable with one of said pluralities of secondary lands for setting the preload of said friction assembly, and said elastic prestressing member and said another adjacent annular member being rotatable with the same coaxial member during relative rotation of said coaxial parts.

2. A device according to claim 1, wherein said plurality of primary lands are disposed on said elastic prestressing member.

3. A device according to claim 2, wherein said pluralities of secondary lands are disposed on said friction ring.

4. A device according to claim 3, wherein said elastic prestressing member is disposed axially between said friction ring member and said one coaxial member.

5. A device according to claim 3, wherein said friction ring member has steps of different heights defining said pluralities of secondary lands and said elastic prestressing member comprises a corrugated spring washer including a plurality of circumferentially spaced corrugations defining said plurality of primary lands.

6. A device according to claim 3, wherein said friction ring member bears directly against the other of said coaxial members.

7. A device according to claim 3, wherein said friction assembly includes a further annular member defining a clamping ring member disposed between said elastic prestressing member and said friction ring member, and wherein pluralities of secondary lands are disposed on said clamping ring.

8. A device according to claim 7, wherein said clamping ring member has notches of different axial depths defining the pluralities of secondary lands and said elastic prestressing member comprises a plurality of radial fingers fixed to the other of said coaxial members and selectively cooperable with notches of different axial depths defining said pluralities of secondary lands.

9. A device according to claim 8, wherein said clamping ring member is fixed for rotation with the other of said coaxial members.

10. A device according to claim 9, wherein said friction ring member is fixed to a support flange coupled for rotation with circumferential play with said one coaxial member.

11. A device according to claim 10, wherein said support flange comprises axially bent lugs and said one coaxial member has openings, said lugs being received with circumferential play in said openings.

12. A device according to claim 11, wherein said coaxial members of said coaxial parts respectively comprise two guide rings rotationally fixed together and a flange disposed axially between said guide rings, said damper means comprising circumferentially acting elastic members engaged in openings in said guide rings and said flange, said support flange comprising at least two radial yokes surrounding with play at least two of said elastic members, said bent lugs being disposed between branches of the same yoke and engaged with play in said openings in said flange associated with said elastic members.

13. A device according to claim 1, wherein said pluralities of secondary lands are disposed on said elastic prestressing member.

14. A device according to claim 13, wherein said another adjacent annular member features circumferentially spaced openings adapted to receive at least one of said pluralities of secondary lands and defines said plurality of primary lands.

15. A device according to claim 14, wherein said elastic prestressing member is a corrugated spring washer having corrugations of different axial heights defining the respective pluralities of secondary lands.

16. A device according to claim 14, wherein said elastic prestressing member is generally frustoconical and has axially projecting lugs of different lengths.

17. A device according to claim 14, wherein said coaxial members of said coaxial parts respectively comprise two guide rings rotationally fixed together and a flange disposed axially between said guide rings, said plurality of primary lands being disposed on one of said guide rings.

18. A device according to claim 1, wherein said elastic prestressing member comprises a corrugated spring washer featuring radial lugs for angularly positioning said corrugated spring washer through said coaxial member of one of said coaxial parts.

19. A device according to claim 1, wherein said elastic prestressing member comprises a spring washer having a radial tab for adjusting the angular position of said plurality of primary lands relative to said pluralities of secondary lands, access being provided through one of said coaxial members to said radial tab.

20. A torsional damper device comprising at least two coaxial parts disposed to rotate relative to one another within defined limits and damper means for opposing such relative rotation of said coaxial parts, said damper means including at least one friction ring, two annular members and an elastic prestressing member disposed axially between said annular members and urging said friction ring axially against one of said coaxial parts, said one annular member having at least one primary transverse land which is circumferentially subdivided and said elastic prestressing member having at least two secondary transverse lands which are axially offset relative to each other and circumferentially subdivided, each of said secondary transverse lands being positioned to contact selectively said primary transverse land, and said one annular member having circumferentially distributed openings for having at least one of said secondary transverse lands pass axially therethrough.

21. A torsional damper device comprising at least two coaxial parts disposed to rotate relative to one another within defined limits and damper means for opposing such relative rotation of said coaxial parts, said damper means including at least one friction ring, two annular members and an elastic prestressing member disposed axially between said annular members and urging said friction ring axially against one of said coaxial parts, said one annular member having at least one primary transverse land which is circumferentially subdivided and said elastic prestressing member having at least two secondary transverse lands which are axially offset relative to each other and circumferentially subdivided, each of said secondary transverse lands being positioned to contact selectively said one primary transverse land, and said elastic prestressing member being generally frustoconical and having axially projecting lugs.

22. A device according to claim 20, wherein said elastic prestressing member is generally frustoconical and has axially projecting lugs.

23. A device according to claim 20, wherein one of the coaxial parts comprises two guide rings fixed for rotation together, and the other of the coaxial parts comprises a flange disposed between the guide rings, the primary land being disposed on one of said guide rings.

* * * * *